United States Patent
Klippert (10) Patent No.: US 6,272,948 B1
(45) Date of Patent: Aug. 14, 2001

(54) DEVICE FOR ENSURING RELATIVE MOTION BETWEEN COMPONENTS OF A CABLE WINDOW LIFTER

(75) Inventor: Uwe Klippert, Oboraula (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 0 days.

(21) Appl. No.: 09/442,597

(22) Filed: Nov. 17, 1999

(30) Foreign Application Priority Data

Nov. 17, 1998 (DE) .............................................. 198 52 977

(51) Int. Cl.[7] ...................................................... F16C 1/16
(52) U.S. Cl. ............................................. 74/500.5; 74/502
(58) Field of Search ........................... 74/500.5, 501.5 R, 74/502, 527; 49/352; 403/DIG. 3

(56) References Cited

U.S. PATENT DOCUMENTS

| | | | |
|---|---|---|---|
| 4,464,950 | * | 8/1984 | Deligny ............................ 74/501.5 R |
| 4,762,017 | * | 8/1988 | Jaksic .................................. 74/500.5 |
| 4,936,161 | * | 6/1990 | Polando .......................... 74/501.5 R |
| 5,138,897 | * | 8/1992 | Beard et al. .................... 74/501.5 R |
| 5,383,377 | * | 1/1995 | Boike ..................................... 74/502 |
| 5,613,405 | * | 3/1997 | Kelley et al. .................... 74/501.5 R |
| 5,653,148 | * | 8/1997 | Reasoner ............................. 74/500.5 |
| 5,746,094 | * | 5/1998 | Medebach et al. ............. 74/501.5 R |
| 5,950,365 | | 9/1999 | Lieb et al. ............................... 49/28 |
| 6,003,403 | * | 12/1999 | Klippert et al. ..................... 74/500.5 |
| 6,085,610 | * | 7/2000 | Gabas et al. .................... 74/501.5 R |
| 6,131,482 | * | 10/2000 | Klippert et al. ..................... 74/500.5 |

FOREIGN PATENT DOCUMENTS 196 18 853 C1  8/1997  (DE).

* cited by examiner

Primary Examiner—David A. Bucci
Assistant Examiner—Chong H. Kim
(74) Attorney, Agent, or Firm—Christie, Parker & Hale, LLP (57) ABSTRACT

The invention relates to a device for providing relative motion between two components of a cable window lifter which lie in the force transfer cord and are prestressed to one another, and functions as a dampener and for ensuring the provision of sensor signals for clamping protection, particularly if severe clamping leads to a sudden and complete standstill of the window pane. The device consists of a component on the casing side and a component positioned directly or indirectly thereto, on which the Bowden of a cable window lifter supports itself, whereby the two displaceable components that are connected to one another through friction locking components are pressed against reciprocally allocated stops by means of a prestressed spring. After completion of the assembly—the connection of the friction locking components is ensured against unintentional loosening through the prestressed spring or one of the components that can be displaced relative to another.

18 Claims, 12 Drawing Sheets

SECTION: A/A

DEVICE FOR ENSURING RELATIVE MOTION BETWEEN COMPONENTS OF A CABLE WINDOW LIFTER

CROSS-REFERENCE TO RELATED APPLICATION

This application claims priority of German Application No. 198 52 977.5 filed Nov. 17, 1998, the disclosure of which is incorporated fully herein by reference.

FIELD OF THE INVENTION

The invention relates to a device for providing relative motion between two components of a cable window lifter that lie in the force transfer cord and are positioned prestressed to one another. The device functions as a dampener and/or for ensuring the provision of sensor signals for clamping protection, in particular when severe clamping leads to a sudden and complete standstill of the window pane.

BACKGROUND OF THE INVENTION

DE 196 18 853 C1 disclosed a motor-driven window lifter with electronic clamping protection, whereby in the flux of force between the drive unit and the window pane there is a prestressed spring with a degressive course. When the prestress force is exceeded, this leads to relative motion of the components that are tensioned to one another, whereby the total stress of the spring is reduced and the clamping force is correspondingly reduced. It is provided that the spring is positioned within an essentially rigid case. The case, which for the purpose of supporting the great prestress force is formed in a comparatively stable way, has a high space requirement that is often not available. In addition, the assembly of the device described requires relatively high resources. The contents of DE 198 52 977.5 are incorporated fully herein by reference.

SUMMARY OF THE INVENTION

It is an object of the present invention to develop a type of device that is characterised by a reduced space requirement, simple assembly, and a small number of components. In addition, with the use of as little material as possible, high stability and operating reliability should nonetheless be ensured. When clippable connecting components are provided for connecting the two tensioned and displaceable components a conflict is solved whereby on the one hand the clippable connecting components should be formed as flexibly as possible for a simple connection process and on the other hand, the clippable connecting components should be formed as rigidly as possible for ensuring high stability of the connection.

According to an embodiment of the present invention, after complete installation of the device, the connection between the friction locking components is ensured against unintended loosening. This occurs preferably through a functional component of this device, thus through one of the components that can be displaced relative to the other, or through the prestressed spring itself, which brings about the pressing apart of the friction locking components.

According to an embodiment of the present invention, after assembly of the device, the friction locking components are at least partly surrounded and supported by the spring in such a way as to prevent a bending open of an elastically deforming or radially displaceable friction locking component. The corresponding friction locking component must therefore simply take up the pulling forces arising through the prestress. Radially oriented forces, such as bending forces, are taken up by the spring. Ideally, the clippable friction locking components of the two axially displaceable components lie completely between the end-side supports of the spring in such a way that the spring encompasses the friction locking components completely.

In adapting to the construction and assembly concept of the window lifter, the device according to an embodiment of the present invention can be formed either as a pre-manufactured unit that can be assembled separately, or as an integral component of the drive unit. For a pre-manufactured unit it would be necessary to provide a bearing opening in a casing component of the drive unit, so that one of the displaceable components of the device can be inserted and supported against a stop. Alternatively, the friction locking components are a constituent part of a casing component and extend along the cable axis.

The friction locking components of the other component are preferably a constituent part of a generally used guiding shell, which through the interposition of a cable length compensation spring supports the end of a Bowden tube. They can, however, also be a constituent part of an adapter that is positioned between the other component carrying friction locking components and the guiding shell. This enables the device according to the invention to be easily inserted into series which are already running by merely shortening the length of a Bowden tube. All other components can be taken over without any changes.

Through the securing of the engaging friction locking components of the components that can be displaced relative to one another and are tensioned with one another, the conditions are created whereby clippable connections can be used as friction locking components. This is a basis for solving the conflict that arises because in order to produce a simple connection between two components, elastically deforming friction locking components should be sought, but the tensioning of these components through a comparatively high spring force requires a solid formation of the connection points. According to the invention, the conflicting demands are met because, at least one component of the device that functions to ensure relative motion after assembly additionally assumes a securing function for the permanent engaging of the friction locking components.

The invention can be brought into effect in embodiments which vary greatly in their construction. Depending upon these different embodiments, for example, either one or both of the clippable areas participating in the connection of the displaceable components should be elastically formed. When both of the clippable areas are elastically formed, the relative degree of deformation of the clippable areas can be kept comparatively lower. In certain circumstances, however, securing measures for both clippable areas are necessary, which guarantee permanent friction locking. The clippable area that springs inwards can be secured via an axial channel, into which the securing component is inserted, e.g. in the form of a guiding shell supporting the Bowden. When only one clippable area is elastically formed, the clippable area of one component is formed essentially rigidly, whereas the other clippable area must have the entire flexibility necessary for the production of friction locking.

The invention is also intended to include a device with a separate securing component, that can be used in association with the generally used guiding shells for cable length compensation of a Bowden tube window lifter. Special stops formed contrary to the assembly direction are intended to guarantee security against the loss of the separate securing component during transport of the device up until its assembly.

According to an additional embodiment of the invention, shell-like components or other components that can be placed radially are used, whereby these components form one of the two displaceable components and support the prestressed spring on one side. The securing of the functional position of these components takes place through friction locking with the end of the spring.

BRIEF DESCRIPTION OF THE DRAWINGS

The invention is described below by reference to embodiments of the invention and the figures illustrated, wherein:

FIG. 1a is a side view of a device with outer clippable areas and a prestressed spring as the securing component.

FIG. 1b is a transverse section of FIG. 1a.

FIG. 1c is a perspective diagram of FIG. 1a.

FIG. 1d is the same as FIG. 1c, but without springs.

FIG. 1e is a perspective diagram of the relatively displaceable component on the casing side.

FIG. 4a is a side view of a device with outer and inner clippable fields as well as outer and inner securing components.

FIG. 4b is a transverse section of FIG. 4a.

FIG. 4c is a perspective diagram of FIG. 4a.

FIG. 4d is the same as FIG. 4c, but without a spring.

FIG. 5d is a perspective diagram of FIG. 5a.

FIG. 5e is a perspective "exploded" diagram of the two displaceable components.

FIG. 5h is a perspective "exploded" diagram of the device of FIG. 5a.

FIG. 6a is a partially sectional side view of a device with a flexible, clippable area that is in pipe form.

FIG. 6b is a transverse section of FIG. 6a.

FIG. 6d is a perspective diagram of FIG. 6a.

FIG. 6e is a perspective exploded diagram of the relatively displaceable components.

FIG. 7c is a perspective diagram of FIG. 7a.

FIG. 7d is the same as FIG. 7c, but without a spring.

FIG. 8c is a perspective diagram of FIG. 8a.

FIG. 8d is the same as FIG. 8c, but without a spring.

DETAILED DESCRIPTION

FIGS. 1a to 1e show a device according to an embodiment of the present invention from different perspectives, whereby rigid inner friction locking components of one component 2a in the form of a ring-form projection 24a engage with flexible, clippable friction locking components 11a of the other component 1a. The hook-like friction locking components 11a of the component 1a form the free end of the area 10a, which is divided into elastic segments through axially running slits 100a (only shown in FIG. 1e). At the other end, the component 1a merges into a pipe-formed guiding area 14a with a reduced diameter, whereby on the inner side this guiding area 14a takes up the guiding tube 25a of the component 2a, and whereby on the outside it carries a spring 4 supported on the casing side to compensate for the cable length.

The upper end of the component 2a is formed as a supporting area 20a for a Bowden tube which is inserted into a tube-like opening 22a and supports itself with its end on the stop 23a. For the purpose of supporting the spring 3, the outer contour of the supporting area 20a is formed as a ring-form projection 21a. The other side of the spring 3 is supported on the ring-form projection 12a of the component 1a, whereby the spring 3 overlaps the area of the friction locking components 11a, 24a, and thus ensures a secure positioning of the elastic fields 10a, even when there is very great axial tension. The prestress force of the spring 3 is generally selected to correspond at least to the sum of the mass force of the window pane and all the forces that are effective up to the device. Therefore, via the lift of the window pane until arrival at the sealing area on the end position side, there is no compressing of the spring 3.

As soon as the supporting force exerted by the Bowden tube on the component 2a exceeds the prestress force of the spring 3, the latter is compressed and the component 2a is displaced in the component 1a. This displacement is limited by a stop 13a, which forms the passage between the areas 10a and 14a. In any case, however, the possible relative motion between the components 1a and 2a is dimensioned to be sufficiently large to ensure that, in the event of a blocking of the displacement movement of the window pane, the drive can still generate the signals necessary for the recognition of the blocking. In the case of a severe, i.e. sudden, blocking, an additional sensor signal must as a rule be fed to the evaluation electronics. The conditions are fulfilled when the relative motion between the two components 1a, 2a is sufficient for the generation of a signal period. It is thereby ensured that after the beginning of the clamping at least one further signal is generated.

Figure 2:
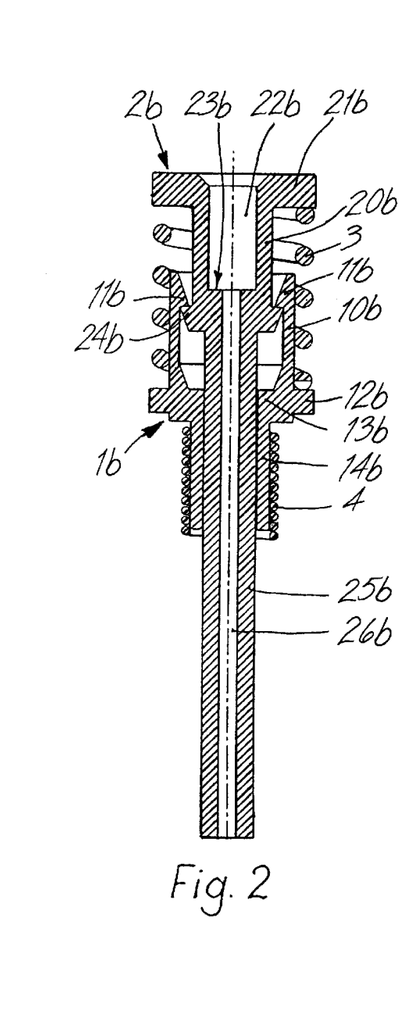
FIG. 2 is a transverse section of a device with a securing component completely encompassing the elastic clippable area.

In comparison with the above-described embodiment, the device according to an alternative embodiment shown in FIG. 2 differs essentially through an axially displaced positioning of the rigid friction locking component 24b of the component 2b and of the ring-form projection 12b of the component 1b. Through the positioning of the ring-form projection 12b in the area of the stop 13b, the spring 3 overlaps the entire elastically deforming area 10b and thus ensures friction locking between the friction locking components 11b and 24b. Note that in FIG. 2 and all other figures, items denoted by a number immediately followed by a subscript letter correspond generally to similarly numbered items with different subscript letters that are appearing in separately numbered figures showing alternate embodiments of the invention.

Figures 1A, 1C, 1D, 1E:
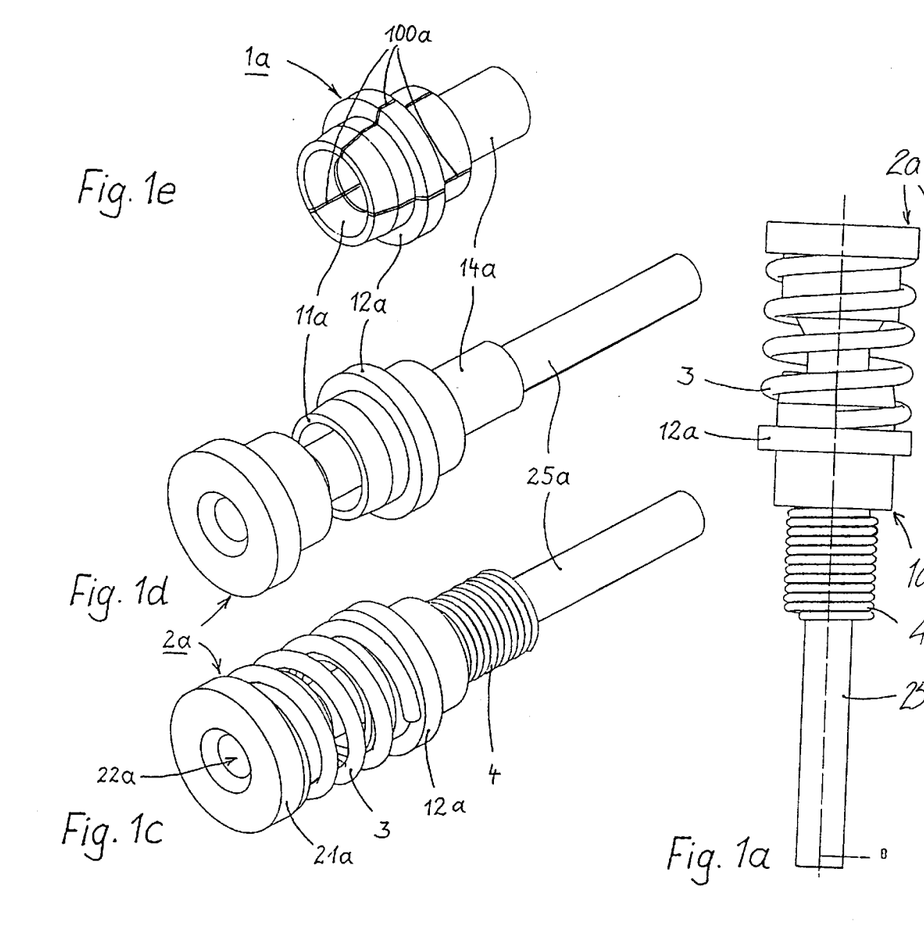
Figure 1B:
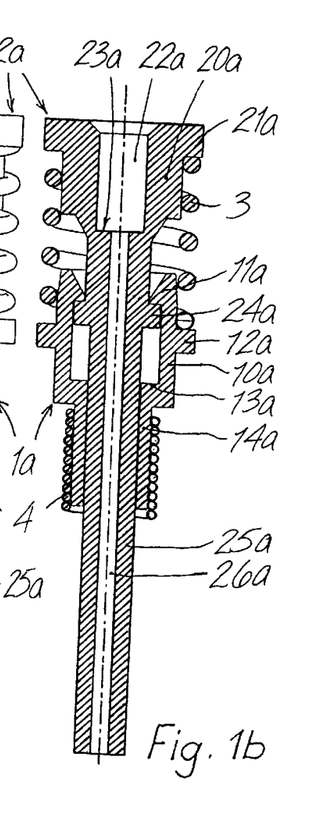
Figure 3:
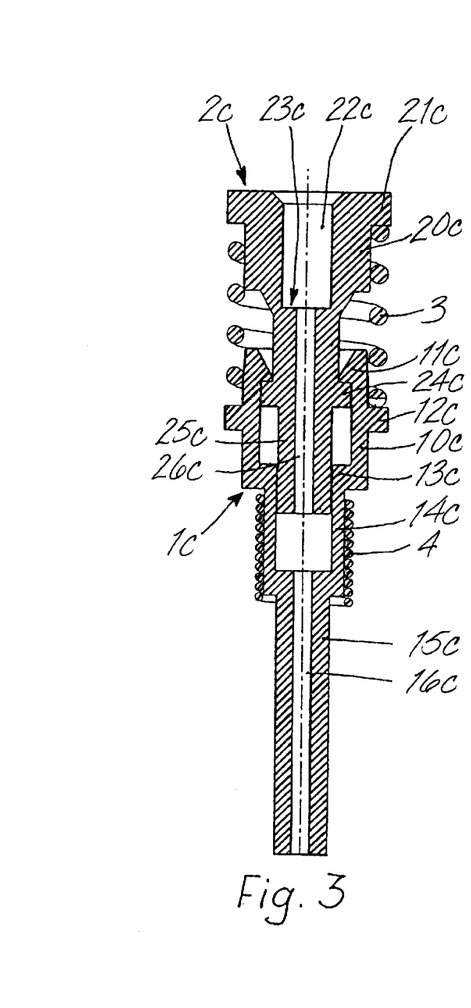
FIG. 3 is a transverse section of a device with guiding channels in both displaceable components.
Figures 4A, 4B:
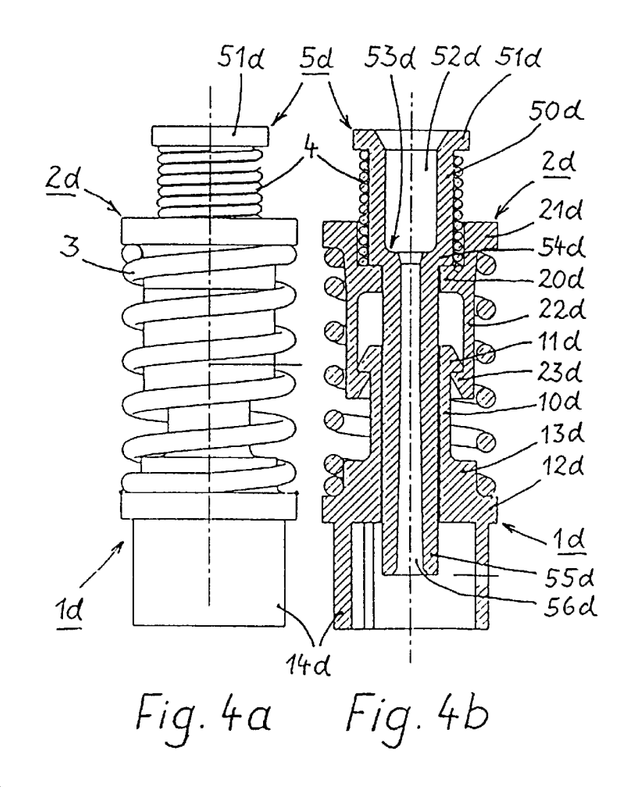
Figures 4C, 4D:
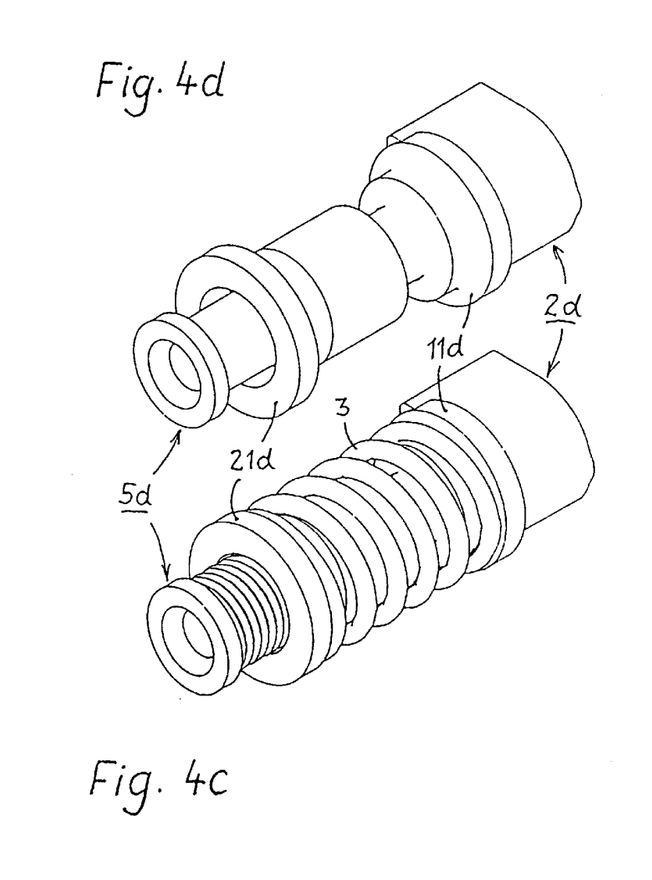

FIG. 3 shows an additional embodiment that is very similar to the device shown in FIG. 1. The device shown in FIG. 3 differs in that the guiding tube 25c which is connected to the Bowden supporting area 20c does not extend through the component 1c, but instead ends in the guiding area 14c. Instead, a further guiding tube 15c connects to the guiding area 14c, so that the cable is fed through two separate channels that are positioned axially behind one another.

The embodiment shown in FIGS. 4a to 4d has displaceable components 1d, 2d, whereby there are friction locking components 11d, 23d which are worked onto the spring elastic fields 10d, 22d. To prevent the friction locking components 11d of the component 1d on the casing side from moving away inwards, a guiding shell 55d is inserted into a corresponding central channel. The guiding shell is also shown with a bottom 53d and a ledge 54d between the supporting area and the channel. The position of the friction locking component 23d of the component 2d on the Bowden side is, as in all the previously described examples, ensured by the encompassing of the spring 3. In order to ensure cable length compensation, a spring 4 is provided, that supports itself on the one hand on the ring-form projection 51d of the supporting area 50d and on the other hand on an inwardly oriented projection 20d of the component 2d, which also serves as a stop for limiting the relative motion between the components 1d, 2d. An advantage of this embodiment is the possibility of further use of guiding shells 5d commonly in use and the simple rearrangement of devices that are already positioned in series without a tensioned spring 3.

FIGS. 5a to 5h show a device whereby the prestressed spring 3 supports itself between a ring-form projection 12e and a hook-like friction locking component 11e of the component 1e on the casing side that is positioned on the free end of the elastic area 10e. The Bowden side component 2e can be inserted between the spring sides (areas 10e) and into the axial channel 16e attached thereto, whereby this Bowden side component 2e works against an inward evasion of the friction locking components 11e. The spring side 10e has in the vicinity of the friction locking component 11e a ledge forming a stop 15e, which—in association with the ledge of the inserted component 2e forming a stop 25e— forms security against loss.

The component 2e also has an axial channel 27e, in which the guiding tube 55e of the guiding shell 5e is fed. The supporting field 50e, which takes the Bowden tube end, has on its outer contour a spring 4 for cable length compensation, whereby this spring 4 supports itself on the one hand on the ring-form projection 51e and on the other hand on the axial stop 24e of the upper end of the displaceable component 2e. In the event of cable lengthening, the spring 4 would push the guiding shell 5e out of the channel 27e of the component 2 by the corresponding length.

Figure 5A:
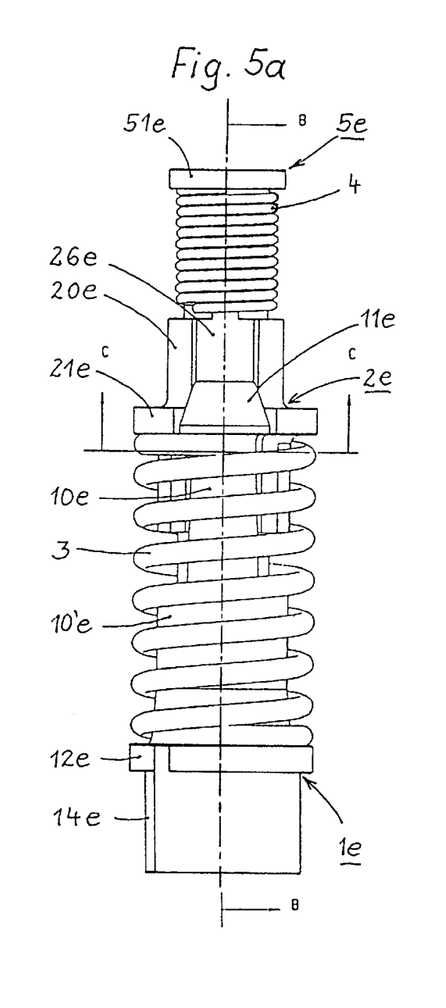
FIG. 5a is a side view of a device with relatively displaceable components which are not tensioned.
Figure 5B:
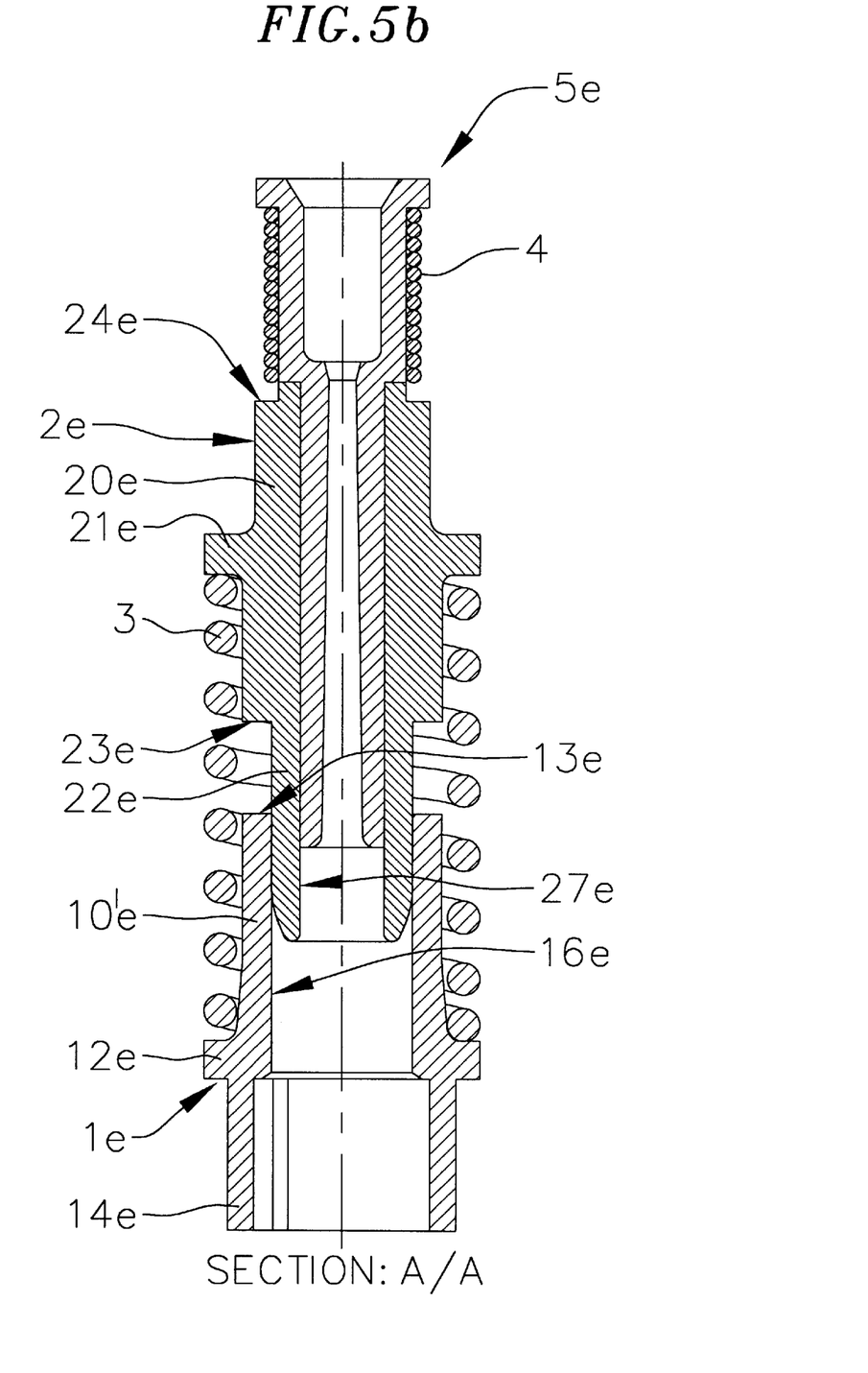
FIG. 5b is a transverse section of FIG. 5a, rotated by 90°.
Figure 5C:
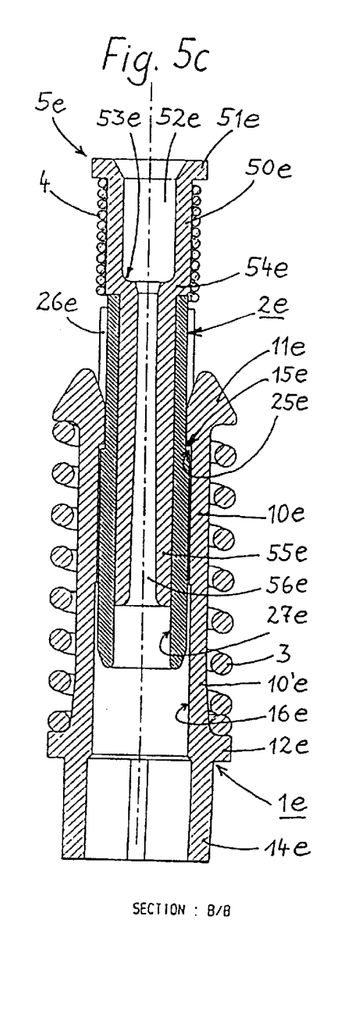
FIG. 5c is a transverse section of FIG. 5a (Section B—B).
Figures 5D, 5E:
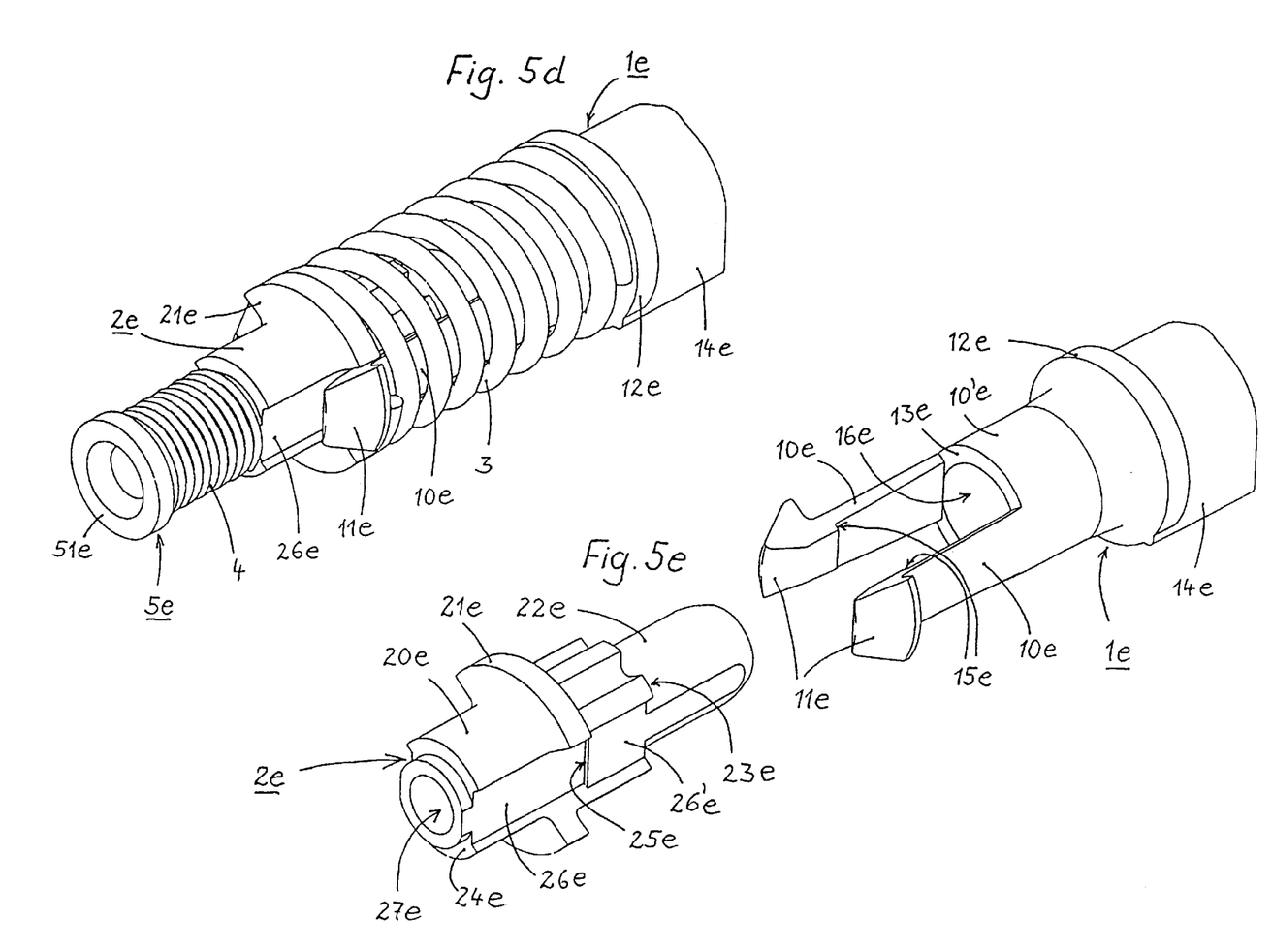
Figure 5F:
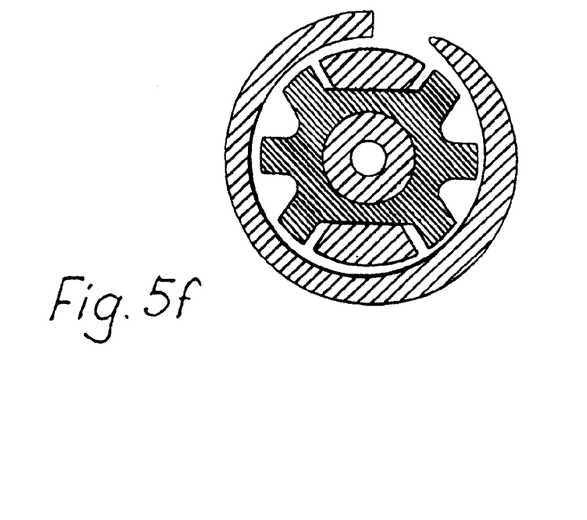
FIG. 5f is a cross-section through the device of FIG. 5a (Section C—C).
Figure 5G:
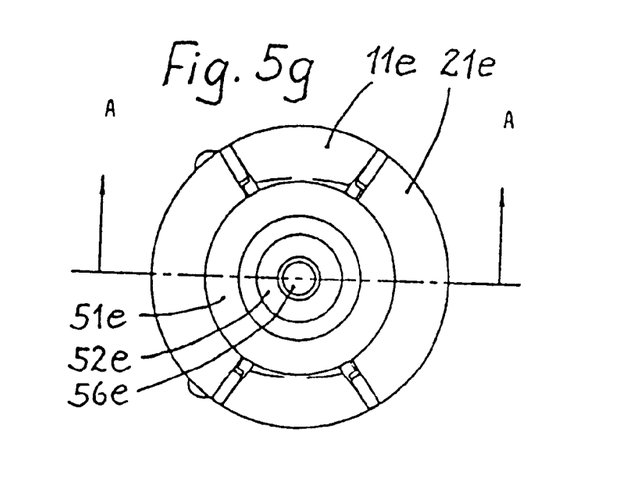
FIG. 5g is a plan view of the device.
Figure 5H:
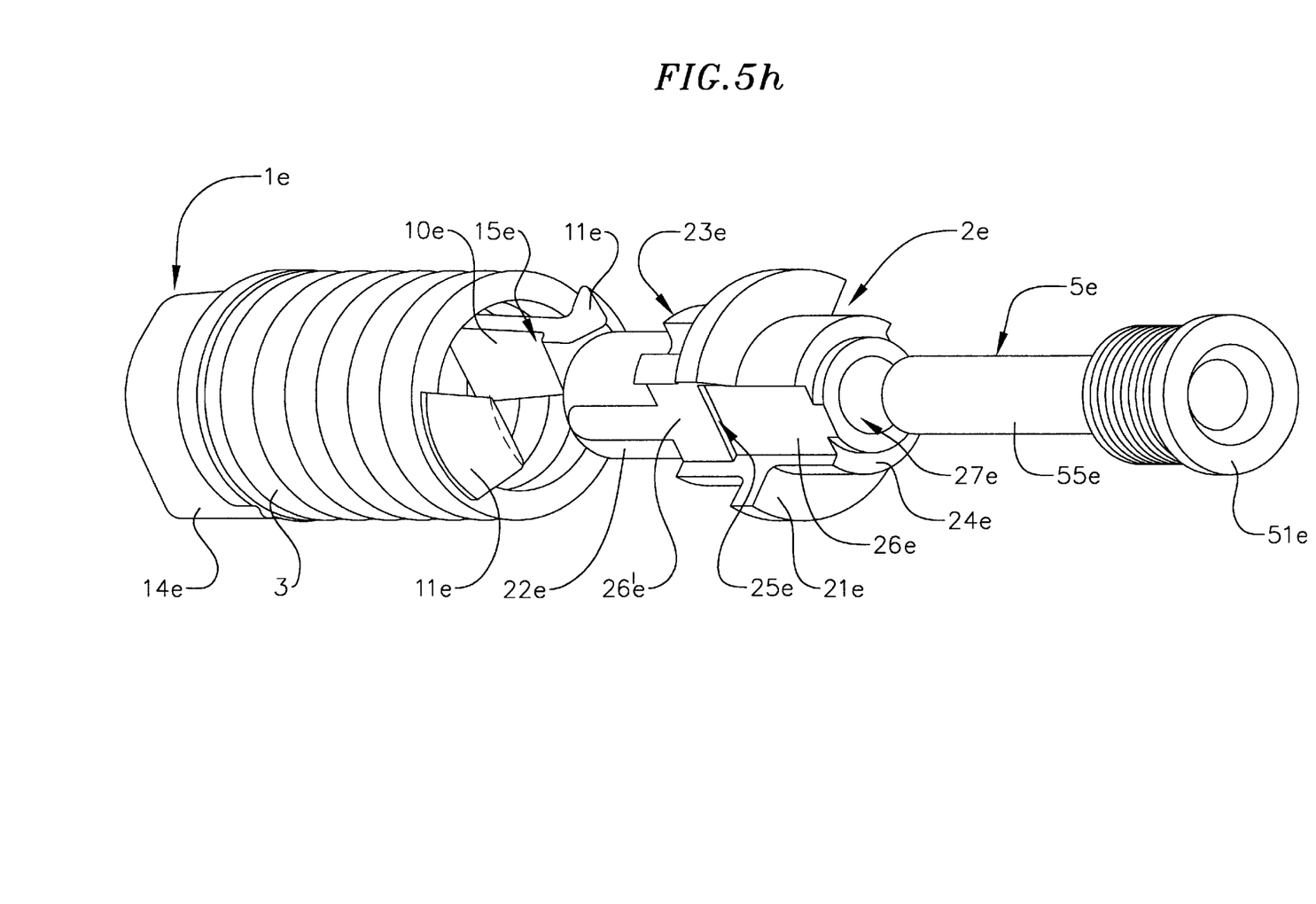
Figures 6A, 6B, 6D, 6E:
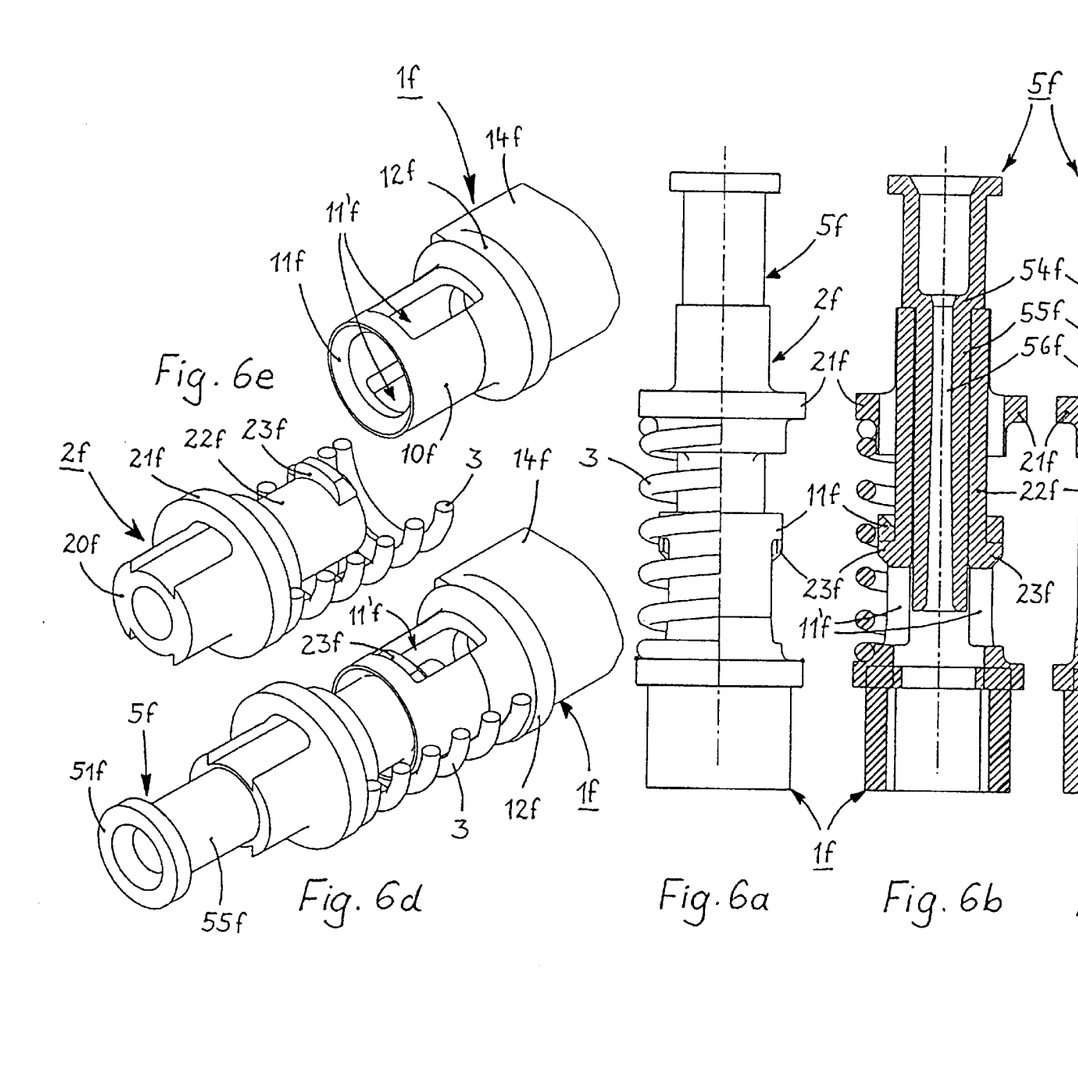
Figure 6C:
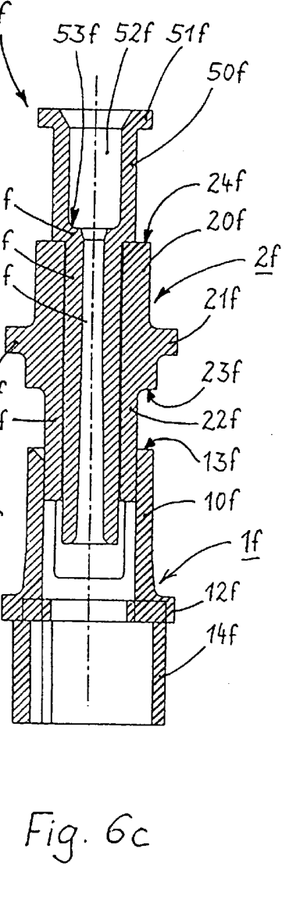
FIG. 6c is a transverse section of FIG. 6a, rotated by 90° with the spring removed.
Figures 7A, 7B:
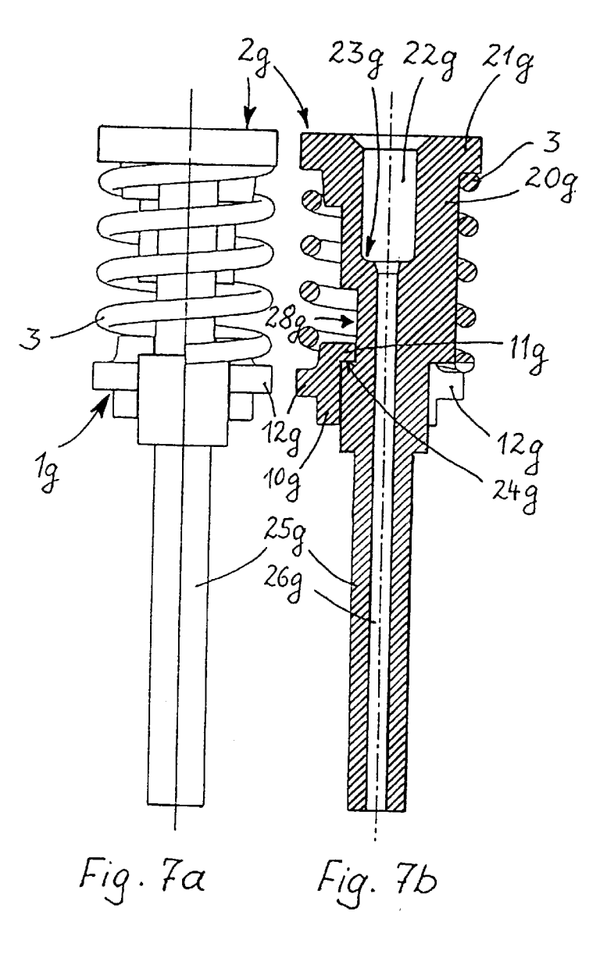
FIG. 7a is a side view of a device wherein one of the two relatively displaceable components is radially positionable.
FIG. 7b is a transverse section of FIG. 7a, rotated by 90°.
Figures 7C, 7D:
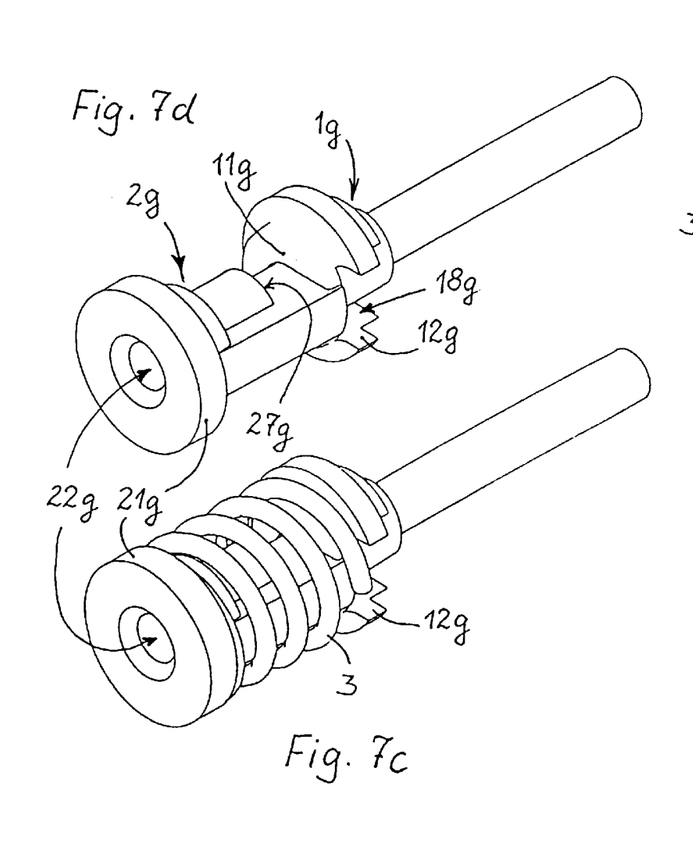

As can be clearly seen from the FIGS. 5b and 5c as well as the FIGS. 5e and 5h, the displaceable components 1e and 2e are not formed rotation-symmetrically. Instead they have opposite-lying, differing sectors with differing functions. Thus, the sector 20e of the component 2e is not only equipped with a stop 24e for the cable length compensating spring 4, but is also equipped with a projection 21e, which transfers the supporting force of the Bowden tube on to the allocated end of the prestressed spring 3, and upon the prestress force being exceeded compresses the spring 3, whereby this goes hand in hand with relative motion between the two components 1e, 2e and a lifting of this spring end from the stops 11e. The component 1e also has a base 10'e. On the other side of the projection 21e the sector 20e has a continuation, which functions in a stop 23e in association with the stop 13e of the component 1e for the purpose of limiting the relative motion. The stopper 22e attaching thereto serves for the guiding of the component 2e in the channel 16e of the component 1e. The area 26'e extending over the stopper 22e into the vicinity of the projection 21e serves for guiding the spring sides 10e and continues via a ledge 25e in the surface 26e. As already mentioned, the combination of the ledges 25e with the ledges 15e on the inner sides of the spring sides 10e gives rise to a security against loss, whereby this is intended to prevent the Bowden side component 2e slipping unintentionally out of the component 1e on the casing side.

FIGS. 6a to 6e show an additional embodiment of the invention. This embodiment uses a component 1f on the casing side, which on the one hand can be connected via the coupling area 14f to a case (not illustrated), and which on the other hand has an elastically deforming area 10f with an essentially cylinder-casing-like contour. The area 10f is provided with recesses 11'f which are limited by the projection 12f provided for supporting the spring 3 and by a closed ring 11f, whereby the inner surface of the ring 11f limiting the recess 11'f functions as a friction locking component for engaging the friction locking component 23f of the component 2f on the Bowden side. The friction locking component 23f is formed as a hook-like projection on the stopper 22f.

Before the connection of the two components 1f and 2f, the spring 3 must be pushed away from the areas of the friction locking components 11f, 23f, in order to allow the elastic deformations necessary for the connection. Upon insertion of the component 2f into the component 1f, first the ring 11f is elastically deformed through the friction locking components 23f until the friction locking components 23f engage in the recess. The spring 3 can subsequently be released, whereby the spring 3 now supports itself between the projections 12f and 21f and encloses the area of the friction locking components 11f and 23f in such a narrow way that the degree of deformation of the friction locking components 11f, 23f necessary for the uncoupling is excluded through the spring 3. A limitation of the spring excursion between the components 1f and 2f is given by the axial length of the recess 11'f in that the edge of the recess 11'f serves as a stop for the friction locking component 23f.

All of the above-described devices have displaceable components 1, 2 that are positioned to one another through an axial assembly movement. This does not apply to the embodiments of the invention of FIGS. 7 and 8, which are explained below. In the embodiments shown in FIGS. 7 and 8, the assembly movement of the component 1g, 1h on the casing side takes place radially to the longitudinal axis of the component 2g, 2h on the Bowden side.

FIGS. 7a to 7d show a component 1g on the casing side with a cut-away portion 18g, which is intended to facilitate a radial positioning on the other component 2g. The component 1g has a radially inward area, whereby this area, upon completion of the assembly, engages a cut-away portion 28g of the component 2g and can engage with a projection of the component 2g functioning as a stop 24g. Between the projections 12g and 21g, the prestressed spring is supported. A permanent and secure positioning of the two components 1g and 2g in relation to one another can be ensured by an axially directed arching 11g over the projection 12g on the side lying opposite the cut-away portion, and by an expansion of the supporting area 20g of the component 2g corresponding approximately to the inner diameter of the spring 3.

If the prestress force of the spring 3 is exceeded by the supporting force of the Bowden tube inserted into the opening 22g, the component 2g is depressed, whereby the stop 11g displaces itself within the cut-away portion 28g. The maximum possible relative motion is again determined through the internal width of the cut-away portion after the assembly of the component 1g.

Figure 8A:
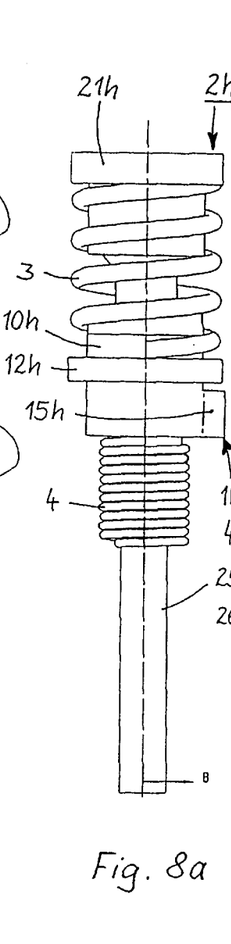
FIG. 8a is a side view of a device one of the two relatively displaceable components is double-shell-formed and radially erectable.
Figure 8B:
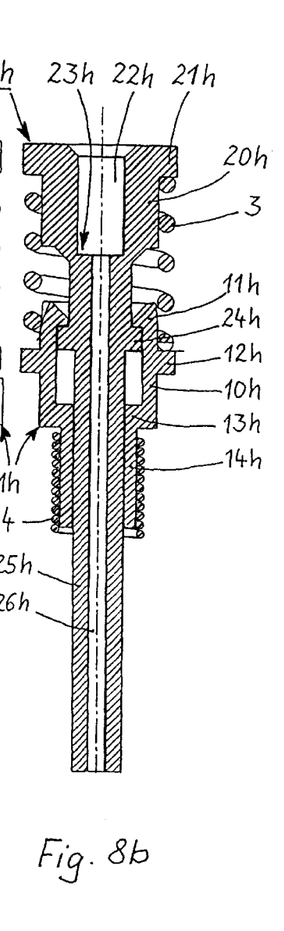
FIG. 8b is a transverse section of FIG. 8a, rotated by 90°.
Figures 8C, 8D:
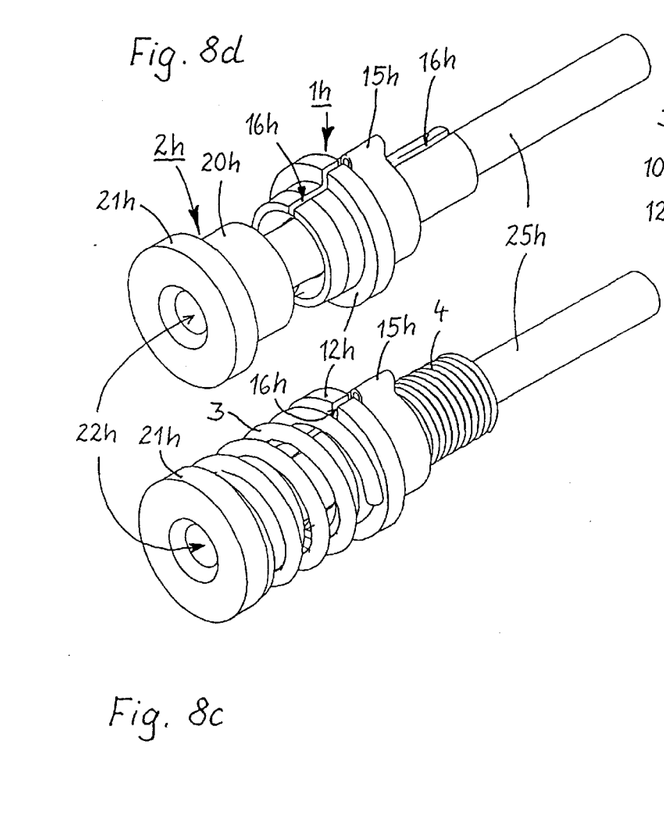

The embodiment shown in FIG. 8 corresponds essentially to that of FIG. 1, but with the difference that the component 1h consists of two half shells divided by slits 16h, whereby these half shells are connected to each other by means of a film joint 15h.

Figure 9:
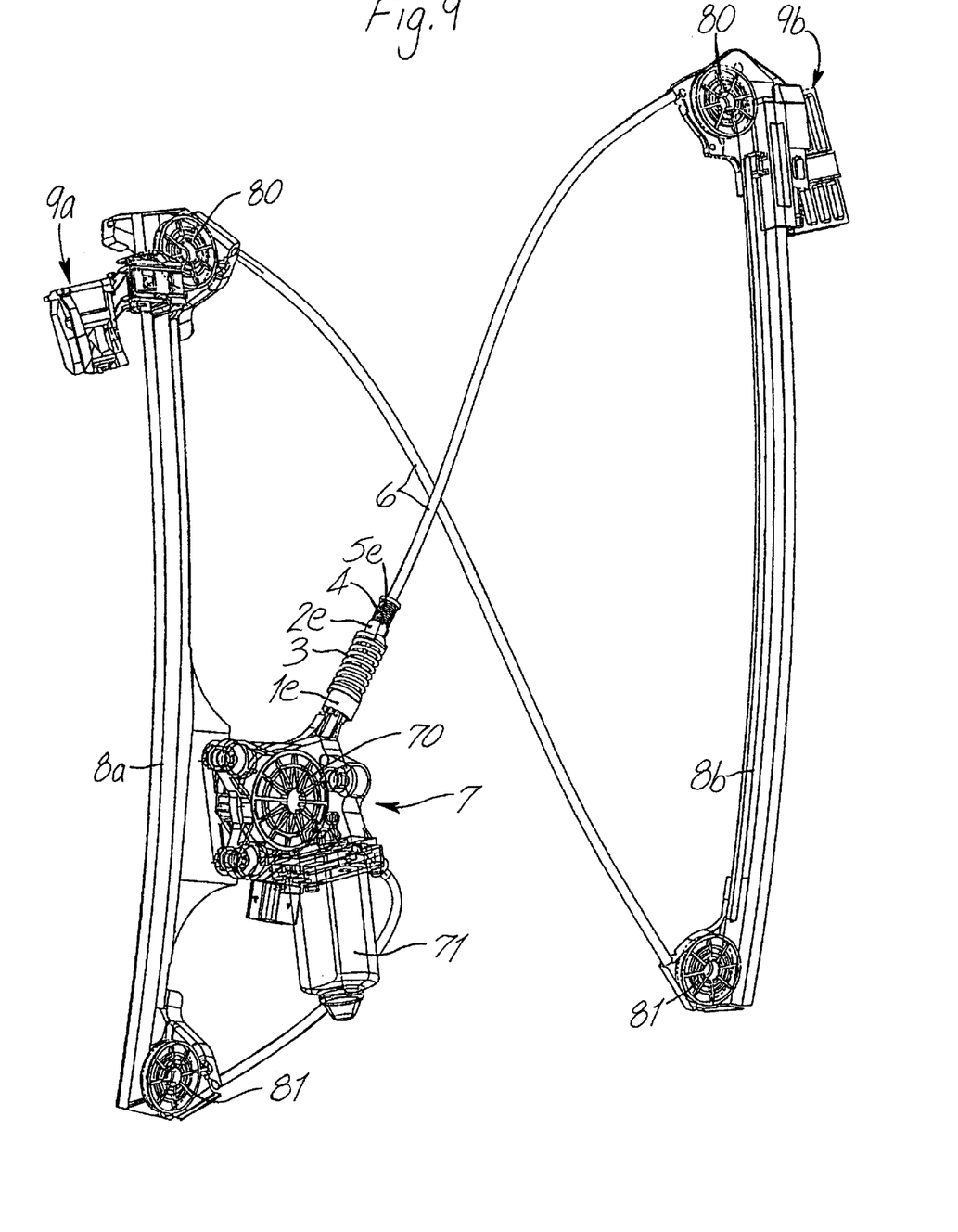
FIG. 9 is a dual cable Bowden tube window lifter with an electric drive and a device according to an embodiment of the present invention which is inserted into a cable exit of the drive case.

FIG. 9 shows a dual cable Bowden tube window lifter with two guiding passages 8a, 8b on which grippers 9a, 9b are positioned in a sliding way for the purpose of connection of the window pane. The driving force is transferred from a drive unit 7 consisting of a motor 71 and drive 70 via the cable loop to the grippers 9a, 9b. The cable is thereby guided trough Bowden tubes 6 and over upper and lower cable deflections 80, 81. A device according to the embodiment shown in FIG. 5 is connected to one of the cable exits of the drive 70.

What is claimed is:

1. A device for a cable window lifter having a Bowden tube and a casing, comprising:
   a first component having a casing side; and
   a second component on which the Bowden tube of the cable window lifter is supportable, whereby the first and second components are displaceable relative to one another and are connected to one another through friction locking components; whereby the first and second components are pressed by a prestressed spring against reciprocally positioned stops, and
   wherein after assembly, the connection of the friction locking components is ensured against unintentional loosening through at least one of the prestressed spring, the first component and the second component.

2. The device according to claim 1 wherein at least one of the friction locking components and flexible areas connected thereto are at least partly encompassed by the spring.

3. The device according to claim 2 wherein the friction locking components are positioned between two end-side supports of the spring so that the friction locking components are completely encompassed by the spring.

4. The device according to one of the preceding claims wherein the first component is an integral component of at least one of a drive case and a cable deflection.

5. The device according to claim 1 wherein the friction locking components of the second component are a constituent part of a guiding shell on which the Bowden tube is supportable.

6. The device according to claim 1 wherein the friction locking components are formed as a clippable connection, which is engageable through an axial displacement of flexible fields carrying the friction locking components.

7. The device according to claim 1 wherein an adapter of the component on the casing side is connected to a bodywork-secure component, including one of a drive case and a cable deflection.

8. The device according to claim 1 wherein the friction locking components of one component are substantially rigidly formed and the friction locking components of the other component are positioned elastically.

9. The device according to claim 8 wherein the friction locking components of one component are essentially rigidly formed and the friction locking components of the other component are formed on recesses in a pipe-form section, whereby the wall thereof is elastically deformed upon insertion of the essentially rigid friction locking components.

10. The device according to claim 1 wherein the friction locking components of both the first and second components are elastically positioned.

11. The device according to claim 7 wherein one component has inner-lying friction locking components and an axial channel into which a securing component is insertable to maintain friction locking with the allocated friction locking components.

12. The device according to claim 11 wherein a guiding tube of a guiding shell functions as the securing component.

13. The device according to claim 1 wherein the prestress of the spring in an unburdened device is exclusively supported through stops of the component on the casing side, wherein these stops are positioned axially at a distance, and the component which is displaceable thereto is held in its functional position by means of an anti-loss mechanism formed from stops oriented contrary to the assembly direction.

14. The device according to claim 13 wherein the stop of the component on the casing side is positioned on the inner side of the flexible area carrying the friction locking component.

15. The device according to claim 1 wherein the friction locking components are formed as a socket-switch connection, whereby the friction locking components of one component are engageable with the friction locking components of the other component through a radially oriented assembly movement.

16. The device according to claim 1 wherein one component consists of shell-like components, which enclose the other component as far as possible.

17. The device according to claim 16 wherein the neighbouring shell-like components consist of synthetic materials and are connected to each other through film joints.

18. A cable window lifting device comprising:
    a casing;
    a Bowden tube;
    a first component coupled to the casing; and
    a second component coupled to the Bowden tube;
    whereby the first and second components are displaceable relative to one another and are connected to one another through friction locking components;
    wherein the first and second components are pressed against reciprocally positioned stops by a prestressed spring,
    wherein after assembly, the connection of the friction locking components is ensured against unintentional loosening through at least one of the prestressed spring, and the first component and the second component.

* * * * *